US007207174B2

(12) United States Patent
Montgomery et al.

(10) Patent No.: US 7,207,174 B2
(45) Date of Patent: Apr. 24, 2007

(54) APPARATUS FOR USE WITH PNEUMATIC DEVICE

(75) Inventors: Kevin M. Montgomery, Cincinnati, OH (US); Joseph A. Abt, Harrison, OH (US)

(73) Assignee: Campbell Hausfeld/Scott Fetzer Company, Harrison, OH (US)

( * ) Notice: Subject to any disclaimer, the term of this patent is extended or adjusted under 35 U.S.C. 154(b) by 0 days.

(21) Appl. No.: 11/200,310

(22) Filed: Aug. 9, 2005

(65) Prior Publication Data

US 2007/0033932 A1 Feb. 15, 2007

(51) Int. Cl.
*F16D 31/02* (2006.01)

(52) U.S. Cl. ........................................................ 60/410

(58) Field of Classification Search ................... 60/410
See application file for complete search history.

(56) References Cited

U.S. PATENT DOCUMENTS

| | | | | |
|---|---|---|---|---|
| 320,482 | A * | 6/1885 | Leavitt | 60/407 |
| 1,484,673 | A | 2/1924 | Redfield | |
| 1,543,680 | A | 6/1925 | Redfield | |
| 2,186,320 | A | 1/1940 | Boldt | |
| 2,234,470 | A | 3/1941 | Dick | |
| 2,244,384 | A * | 6/1941 | Bissinger | 60/410 |
| 2,267,479 | A | 12/1941 | Sturm et al. | |
| 2,448,379 | A | 8/1948 | Mantle | |
| 5,520,519 | A | 5/1996 | Birkeland | |
| 5,902,094 | A | 5/1999 | Hoenisch et al. | |
| 5,911,562 | A | 6/1999 | Murphy et al. | |
| 6,227,815 | B1 | 5/2001 | Chandra et al. | |
| 6,357,338 | B2 | 3/2002 | Montgomery | |
| 6,386,833 | B1 | 5/2002 | Montgomery | |
| 6,435,076 | B2 | 8/2002 | Montgomery | |

* cited by examiner

*Primary Examiner*—F. Daniel Lopez
(74) *Attorney, Agent, or Firm*—Jones Day

(57) ABSTRACT

A control valve assembly has a first chamber with a first port, a second chamber with a second port, and a first valve that is operative to open between the first and second chambers in response to elevated pneumatic pressure in the first chamber. A second valve is operative to open between the second chamber and a primary exit port to vent the second chamber in response to elevated pneumatic pressure in the second chamber. A third valve is operative to open between the first chamber and a bypass exit port to vent the first chamber in response to elevated pneumatic pressure in the first chamber.

20 Claims, 4 Drawing Sheets

APPARATUS FOR USE WITH PNEUMATIC DEVICE

TECHNICAL FIELD

This technology relates to the field of pneumatic valves.

BACKGROUND

A compressor can provide compressed air for operating a pneumatic device. If the compressed air is stored in a reservoir for later use, pneumatic lines and valves can be used to direct the compressed air to flow from the compressor into the reservoir until the reservoir reaches a sufficient storage pressure. The lines and valves can then direct the compressed air from the reservoir to the pneumatic device.

SUMMARY

To summarize, the example apparatus can be described as a control valve assembly having chambers, ports and valves. These include a first chamber with a first port, a second chamber with a second port, and a first valve that is operative to open between the first and second chambers in response to elevated pneumatic pressure in the first chamber. A second valve is operative to open between the second chamber and a primary exit port to vent the second chamber in response to elevated pneumatic pressure in the second chamber. Additionally, a third valve is operative to open between the first chamber and a bypass exit port to vent the first chamber in response to elevated pneumatic pressure in the first chamber.

The example apparatus can be summarized differently in the context of a particular implementation of the apparatus. For example, the example apparatus can be described as being for use with a source of compressed air, a reservoir of compressed air, and a pneumatic device. Such an apparatus may comprise a control valve assembly that is configured to be connected pneumatically between the source, the reservoir, and the pneumatic device. The control valve assembly is further configured to be shiftable between open and closed conditions respectively opening and closing pneumatic flow paths that extend separately through the control valve assembly. The flow paths include a first flow path extending from the source to the reservoir, a second flow path extending from the reservoir to the pneumatic device, and a third flow path extending from the source to the pneumatic device.

In another implementation summary, the example apparatus can be described as being for use with a pneumatic device. Such an apparatus includes a source of compressed air, a reservoir for compressed air, and a pneumatic coupling connectable to the pneumatic device. The apparatus also includes a control valve assembly having a housing with ports that are interconnected by chambers within the housing. The ports include a source port pneumatically connected to the source, a reservoir port pneumatically connected to the reservoir, a primary exit port pneumatically connected to the coupling, and a bypass exit port pneumatically connected to the coupling in parallel with the primary exit port.

EXAMPLES FOR ENABLEMENT AND BEST MODE

Figure 1:
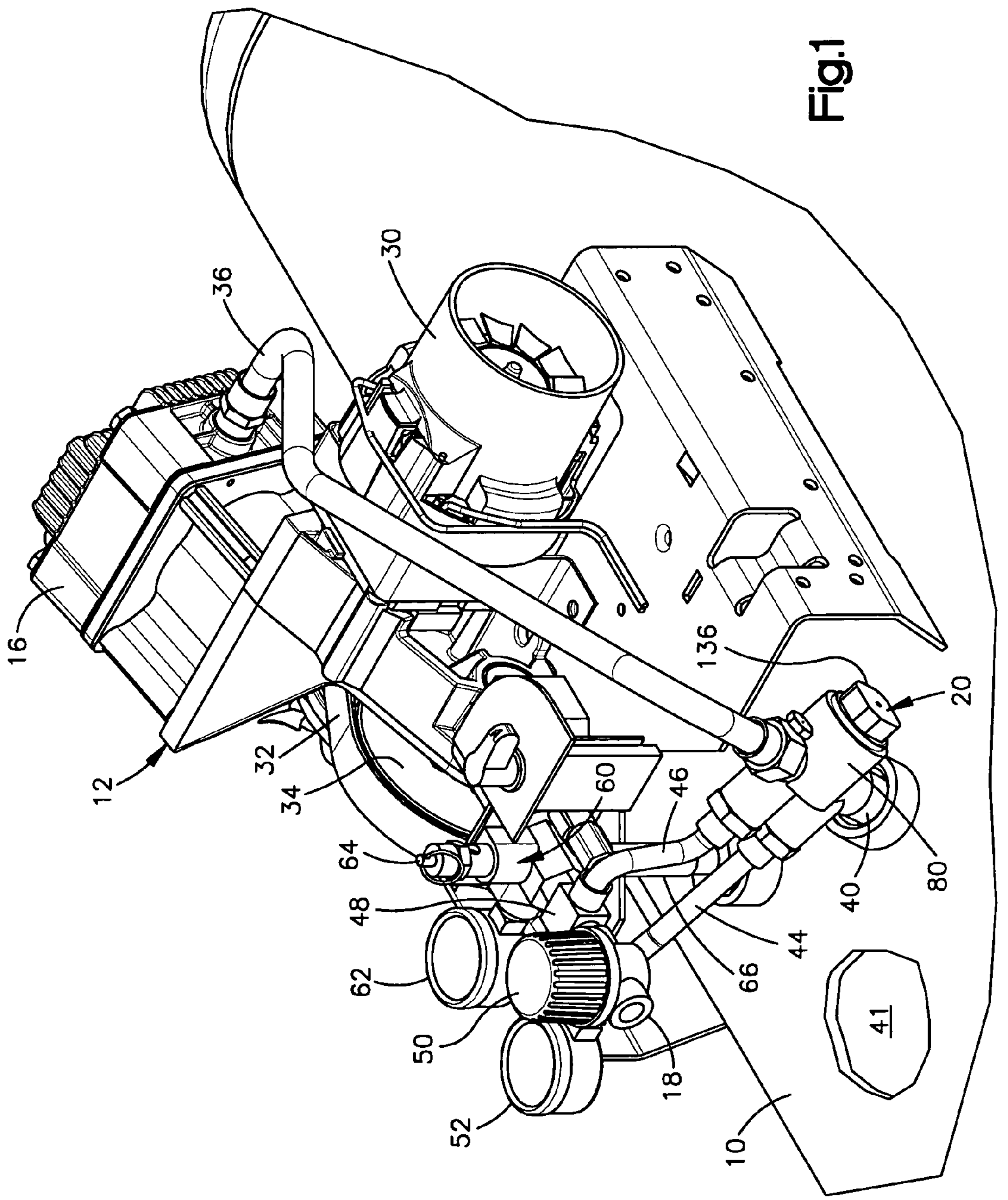
FIG. 1 is a view of a compressor assembly mounted on a tank.

The apparatus shown in the drawings has parts that are examples of the structural elements recited in the claims, and thus includes examples of how a person of ordinary skill in the art may make and use the example apparatus. That apparatus is described here to provide enablement and the best mode without imposing limitations that are not recited in the claims.

The parts of the apparatus that are shown in FIG. 1 include a tank 10 and a compressor assembly 12 that is mounted on the tank 10. In this example, the tank 10 has wheels and a handle (not shown) for the user to transport the apparatus manually. The compressor assembly 12 includes a compressor 16, an output coupling 18, and a control valve assembly 20. The output coupling 18 is connectable to a coupling on a pneumatic line that leads to a pneumatic device such as, for example, a coupling 22 on a pneumatic line that leads to a hand-held pneumatic tool 24 as shown schematically in FIG. 2. The control valve assembly 20 enables the user to direct compressed air to flow from the compressor 16 to the tank 10 to be stored for later use or, alternatively, to direct the compressed air to bypass the tank 10 and flow from the compressor 16 to the pneumatic device 24 for immediate use.

Figure 2:
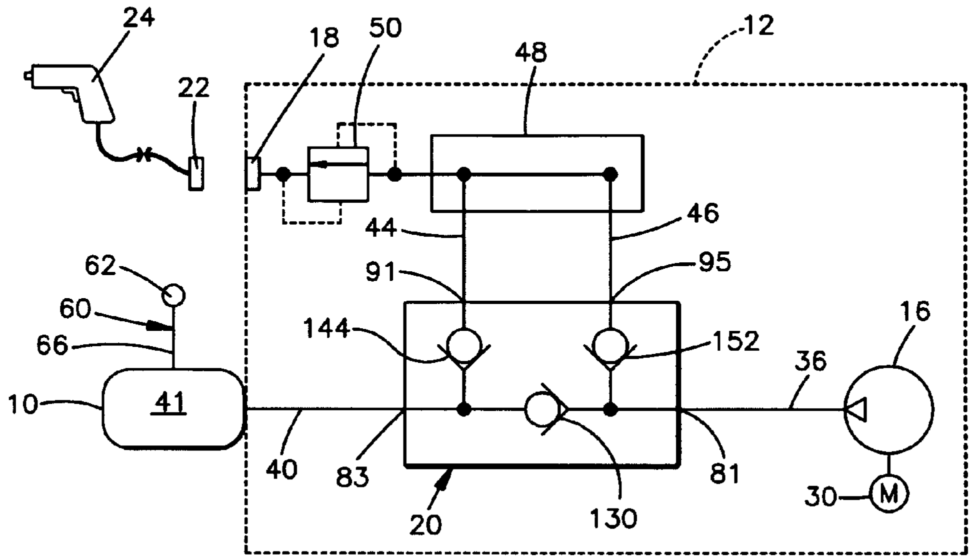
FIG. 2 is a schematic view of the compressor assembly, the tank, and a pneumatic device.

The compressor assembly 12 has a motor 30 and a drive belt 32 for rotating a flywheel 34. The flywheel 34 is linked to a piston that reciprocates in the compressor 16 to provide compressed air on a supply line 36 that connects the compressor 16 pneumatically with the control valve assembly 20. Other pneumatic lines in the compressor assembly 12 include a reservoir line 40 that connects the control valve assembly 26 pneumatically with the reservoir 41 in the tank 10, as well as primary and bypass exit lines 44 and 46 that connect the control valve assembly 20 pneumatically with a cross-coupling 48. An actuator valve in the form of a pressure regulator 50 is interposed between the cross-coupling 48 and the output coupling 18 for the pneumatic device 24 (FIG. 2). The regulator 50 has a gauge 52, and is shiftable between a closed position and a range of open positions with a corresponding range of output pressures.

Also shown in FIG. 1 is a gauge assembly 60 including a gauge 62 and a pressure relief valve 64. A gauge line 66 connects those parts pneumatically with the tank 10. A pressure switch within the gauge assembly 60 monitors the storage pressure in the reservoir 41, and is operatively connected with the motor 30 to shut off the compressor 16 when the storage pressure reaches a maximum level.

Figure 3:
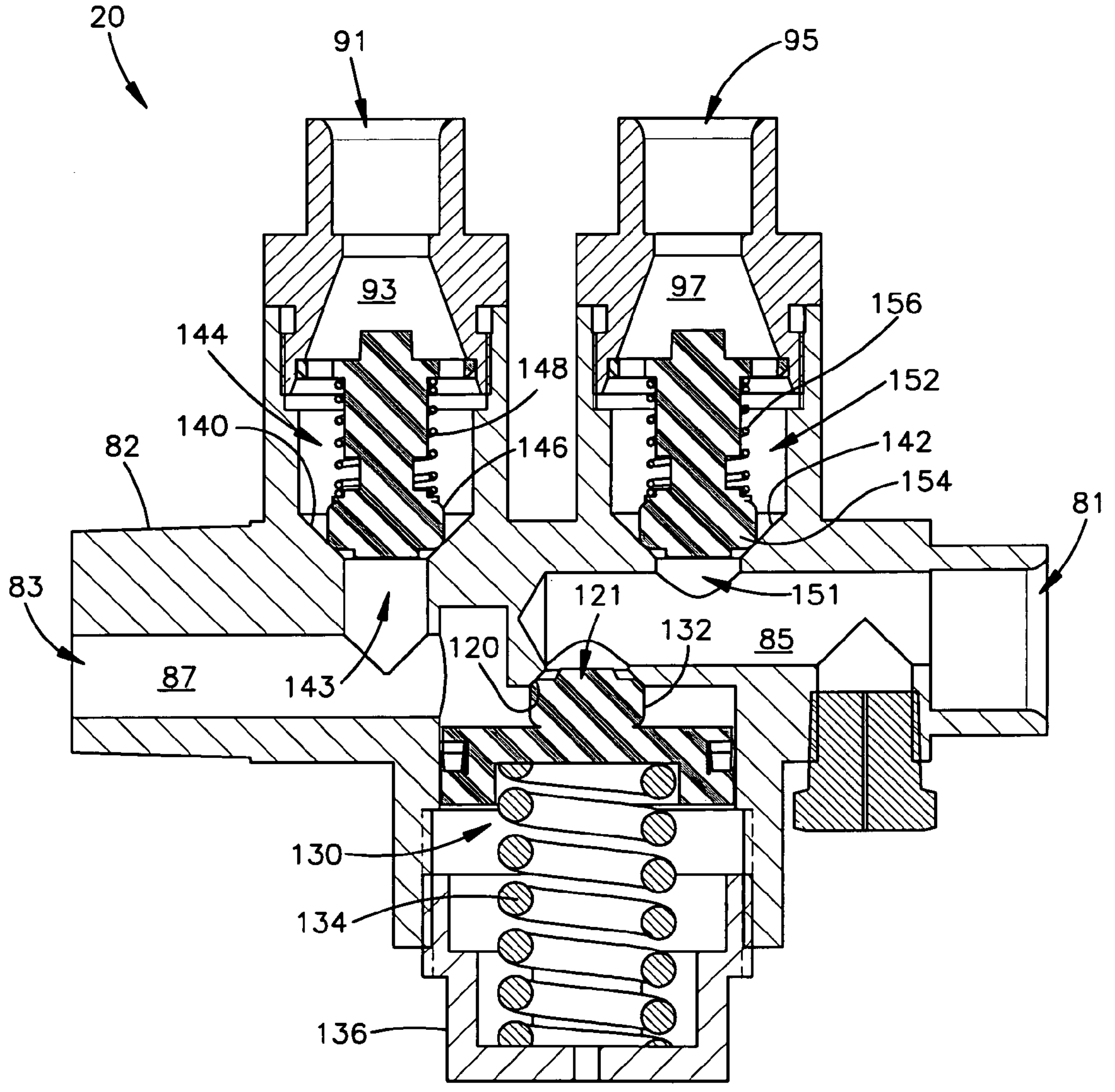
FIG. 3 is an enlarged sectional view of parts shown in FIGS. 1 and 2.

As shown in greater detail in FIG. 3, the control valve assembly 20 has a housing 80 with ports that are interconnected by chambers within the housing 80. These include a source port 81 and a reservoir port 83. The source port 81 defines an outer end of a source chamber 85, and is connected to the pneumatic supply line 36 as shown in FIGS. 1 and 2. The reservoir port 83 defines an outer end of a reservoir chamber 83, and is connected to the reservoir line 40 as shown in FIGS. 1 and 2. A primary exit port 91 defines an outer end of a primary exit chamber 93. The primary exit port 91 is connected to the primary exit line 44 (FIGS. 1 and 2). A bypass exit port 95 defines the outer end of a bypass exit chamber 97. The bypass exit port 95 is connected to the bypass exit line 46 (FIGS. 1 and 2). The cross coupling 48 connects the primary and bypass exit lines 44 and 46 to the regulator 50 in parallel with each other.

A conical inner surface 120 of the housing 80 defines a valve seat that surrounds an orifice 121 between the source chamber 85 and the reservoir chamber 87. The orifice 121 is normally closed by a first check valve 130 with a piston 132 that is biased against the valve seat 120 by a spring 134. The spring 134 is compressed between the piston 132 and a rotatable end cap 136 that enables the user to adjust the force with which the spring 134 holds the piston 132 in the closed position. The first check valve 130 is thus operative to open between the source chamber 85 and the reservoir chamber 87 under elevated pneumatic pressure acting against the piston 132 in the source chamber 85.

The housing 80 further has a conical inner surface 140 defining a valve seat in the primary exit chamber 93, and an additional conical inner surface 142 defining a valve seat in the bypass exit chamber 97. The valve seat 140 in the primary exit chamber 43 surrounds an orifice 143 between the reservoir chamber 87 and the primary exit chamber 93. The orifice 143 is normally closed by a second check valve 144 with a piston 146 that is biased against the valve seat 140 by a spring 148. In a similar arrangement, the valve seat 142 in the bypass exit chamber 97 surrounds an orifice 151 between the source chamber 85 and the bypass exit chamber 97. That orifice 151 is normally closed by a third check valve 152 with a piston 154 that is biased against the valve seat 142 by a spring 156. The second check valve 144 is operative to open between the reservoir chamber 87 and the primary bypass chamber 93 under elevated pneumatic pressure acting against the piston 146 in the reservoir chamber 87. The third check valve 152 is operative to open between the source chamber 85 and the bypass exit chamber 97 under elevated pneumatic pressure acting against the piston 154 in the source chamber 85.

Each of the three check valves 130, 144 and 152 is operative to open under a corresponding level of pneumatic pressure. Accordingly, the first check valve 130 opens under elevated pressure of at least a first level. The first elevated pressure level is less than the maximum level of storage pressure in the reservoir 41, but is greater than the level needed for operation of a pneumatic device that can be powered by the compressor assembly 12. The second check valve 144 opens under elevated pressure of at least a second level, and the third check valve 152 opens under elevated pressure of at least a third level. The second and third elevated pressure levels are both less than the first, and are preferably equal to each other. Moreover, the second and third elevated pressure levels are not higher than the level needed to operate a pneumatic device that can be powered by the compressor assembly 12, and are preferably lower.

The user can charge the tank 12 with compressed air to a desired level of storage pressure by turning on the compressor 16 with the regulator 50 in a closed condition. Compressed air is then directed from the compressor 16 to the control valve assembly 20 along the supply line 36. As the supply chamber 85 (FIG. 3) in the control valve assembly 20 becomes pressurized, the third check valve 152 opens first. Compressed air is then directed through the bypass exit chamber 97 to the bypass exit port 95, and through the bypass exit line 46 and the cross-coupling 48 to the pressure regulator 50 which, as noted above, is closed. As the source chamber 85 becomes further pressurized, the first check valve 130 opens to enable the compressed air to flow from the source chamber 85 to the reservoir chamber 87, and from the reservoir port 83 to the reservoir 41 through the reservoir line 40, as indicated by the arrows in FIG. 4. That flow of compressed air continues as long as the pressure in the source chamber 85 remains at or above the first elevated pressure level under the influence of the compressor 16. When the storage pressure in the reservoir 41 reaches a level desired by the user, as indicated by the gauge 62 in the gauge assembly 60, the user can shut off the compressor 16. Alternatively, the user can let the compressor 16 run until the pressure switch in the gauge assembly 60 shuts off the compressor 16 upon sensing that the maximum storage pressure has been reached.

Figure 5:
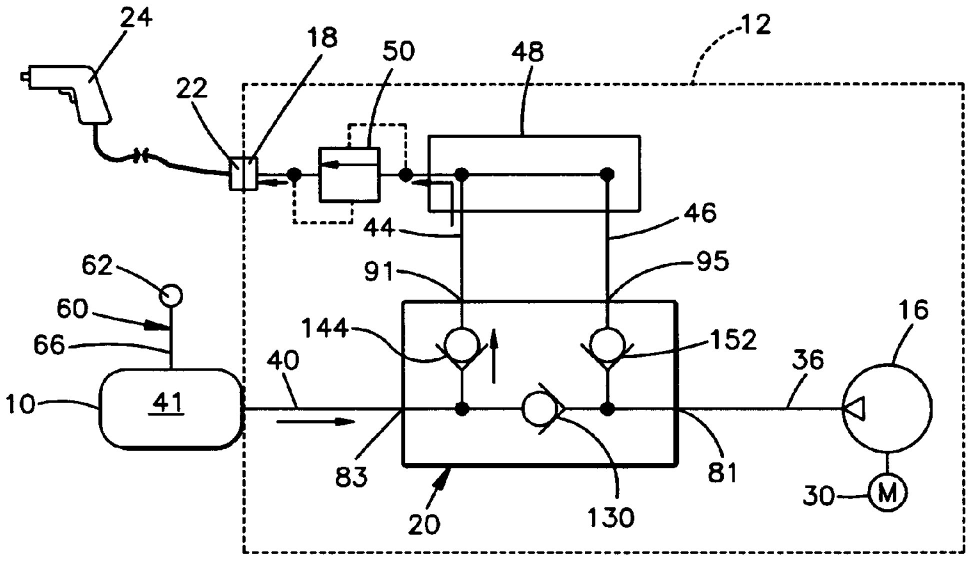
FIGS. 5 and 6 also are schematic views similar to FIG. 2; each showing a different pneumatic flow path through the compressor assembly.

In operation of a pneumatic device 24, the user first connects the coupling 22 for the pneumatic device 24 to the output coupling 18 on the compressor assembly 12, as shown schematically in FIG. 5. The compressor assembly 12 can then be operated in either a primary mode or a bypass mode. The primary mode of operation is available if the reservoir 41 contains compressed air at a storage pressure level at least as high as the level needed to operate the pneumatic device 24. The storage pressure is transmitted from the reservoir 41 to the second check valve 144 through the reservoir line 40, the reservoir port 83 and the reservoir chamber 87. As described above, the second check valve 144 is operative to open in response to that level of pressure in the reservoir chamber 87. This causes the storage pressure to be transmitted through the primary exit chamber 93 to the primary exit port 91, and through the primary exit line 44 and the cross-coupling 48 to the pressure regulator 50. The user can then initiate the primary mode of operation by opening the pressure regulator 50 to enable the compressed air to flow from the reservoir 41 to the output coupling 18 and the pneumatic device 24 along the flow path indicated by the arrows shown in FIG. 5. The regulator 50 enables the user to regulate the pneumatic pressure at the output coupling 18 appropriately for the particular type of pneumatic device 24 to be driven by the flow of compressed air.

Figure 6:
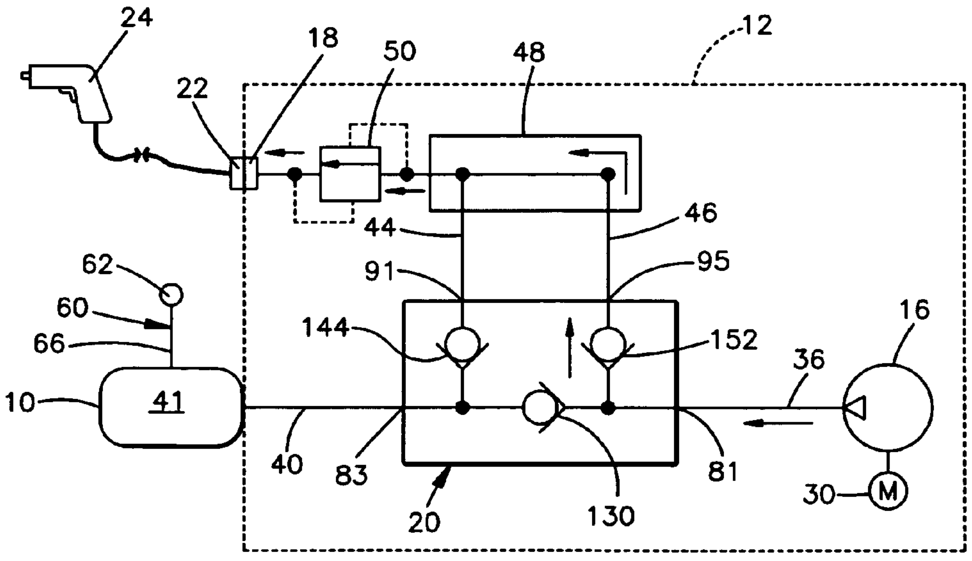

In the bypass mode of operation, the compressor assembly 12 provides compressed air for operation of the pneumatic device 24 when the storage pressure in the reservoir 41 is less than the level needed to operate the pneumatic device 24. A first example of the bypass mode of operation is shown in FIG. 6. With the regulator 50 in a closed condition, and with the compressor 16 running, the source chamber 85 (FIG. 3) becomes charged with compressed air at an elevated pressure level sufficient to operate the pneumatic device 24. This causes the third check valve 152 to open while the first check valve 130 remains closed. The source pressure in the source chamber 85 is transmitted through the bypass exit chamber 97 to the bypass exit port 95, and further through the bypass exit line 46 and the cross-coupling 48 to the pressure regulator 50. The user can then initiate the bypass mode of operation by opening the pressure regulator 50 to enable the compressed air to flow from the compressor 16 to the output coupling 18 and the pneumatic device 24 along the flow path indicated by the arrows shown in FIG. 6. As in the primary mode of operation, the regulator 50 enables the user to regulate the pneumatic pressure at the output coupling 18 as needed for the particular type of pneumatic device 24 to be driven by the flow of compressed air.

Figure 4:
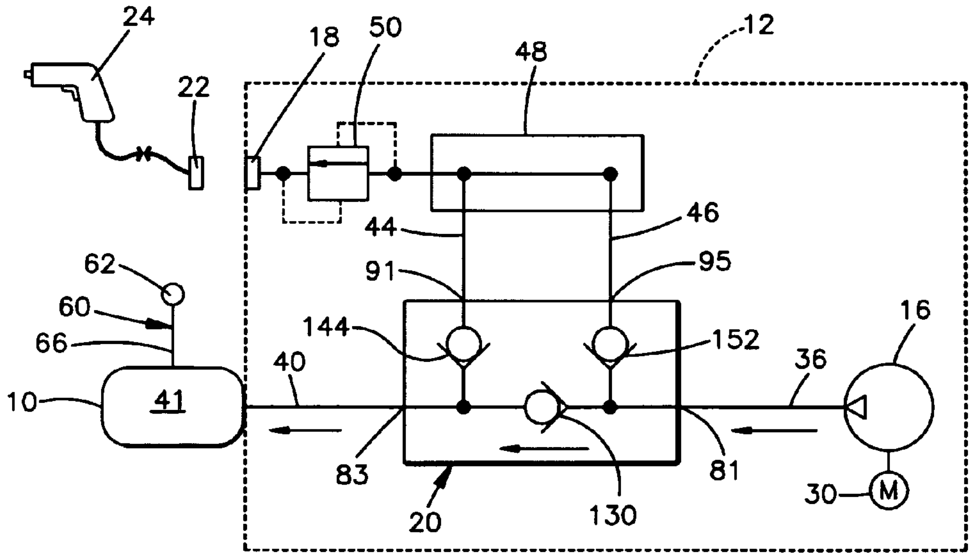
FIG. 4 is a schematic view similar to FIG. 2, showing a pneumatic flow path through the compressor assembly.

In a second example of the bypass mode, the user may turn on the compressor 16 and, with the regulator 50 closed, allow the source chamber 85 to become pressurized to a level at which the first check valve 130 opens to enable the reservoir 41 to receive compressed air from the compressor 16, as indicated in FIG. 4. If the user chooses not to wait until the reservoir 41 reaches a storage pressure sufficient to operate the pneumatic device 24, the regulator 50 can be opened to provide compressed air output for immediate use by the pneumatic device 24. Specifically, opening the pressure regulator 50 causes a pressure drop in the source chamber 85. The pressure drop causes the first check valve 130 to close. This diverts the compressed air from the flow path of FIG. 4 to the bypass flow path of FIG. 6.

The patentable scope of the example described herein is defined by the claims, and may include other examples of how the claimed device may be made and used. Such other examples, which may be available either before or after the application filing date, are intended to be within the scope of the claims if they have structural or process elements that do not differ from the literal language of the claims, or if they have equivalent structural or process elements with insubstantial differences from the literal language of the claims.

The invention claimed is:

1. An apparatus comprising:

a control valve assembly having a first chamber with a first port, a second chamber with a second port, and a first valve that is operative to open between said first and second chambers in response to elevated pneumatic pressure in said first chamber;

said control valve assembly having a primary exit port for venting said second chamber, and a second valve that is operative to open between said second chamber and said primary exit port in response to elevated pneumatic pressure in said second chamber;

said control valve assembly further having a bypass exit port for venting said first chamber, and a third valve that is operative to open between said first chamber and said bypass exit port in response to elevated pneumatic pressure in said first chamber; and a pneumatic coupling that is connectable to said control valve assembly in an arrangement in which said bypass exit port is connected to said pneumatic coupling in parallel with said primary exit port.

2. An apparatus as defined in claim 1 wherein said pneumatic coupling is an output coupling, and further comprising an actuator valve that is pneumatically connectable between said control valve assembly and said output coupling, and is shiftable between open and closed conditions between said exit ports and said output coupling.

3. An apparatus as defined in claim 2 wherein said actuator valve is a pressure regulator.

4. An apparatus comprising:

a control valve assembly having a first chamber with a first port, a second chamber with a second port, and a first valve that is operative to open between said first and second chambers in response to elevated pneumatic pressure in said first chamber;

said control valve assembly having a primary exit port for venting said second chamber; and a second valve that is operative to open between said second chamber and said primary exit port in response to elevated pneumatic pressure in said second chamber;

said control valve assembly further having a bypass exit port for venting said first chamber, and a third valve that is operative to open between said first chamber and said bypass exit port in response to elevated pneumatic pressure in said first chamber;

wherein said first, second and third valves are spring loaded check valves.

5. An apparatus comprising:

a control valve assembly having a first chamber with a first port, a second chamber with a second port, and a first valve that is operative to open between said first and second chambers in response to elevated pneumatic pressure in said first chamber;

said control valve assembly having a primary exit port for venting said second chamber, and a second valve that is operative to open between said second chamber and said primary exit port in response to elevated pneumatic pressure in said second chamber;

said control valve assembly further having a bypass exit port for venting said first chamber, and a third valve that is operative to open between said first chamber and said bypass exit port in response to elevated pneumatic pressure in said first chamber;

wherein said first valve is operative to open in response to pneumatic pressure of at least a first level, said second valve is operative to open in response to pneumatic pressure of at least a second level that is less than said first level, and said third valve is operative to open in response to pneumatic pressure of at least a third level that is less than said first level.

6. An apparatus as defined in claim 5 wherein said second and third levels are equal.

7. An apparatus for use with a pneumatic device, said apparatus comprising:

a tank;

a compressor;

a pneumatic output coupling connectable to the pneumatic device; and a control valve assembly having a source chamber with a source port pneumatically connected to said compressor, a reservoir chamber with a reservoir port pneumatically connected to said tank, and a first valve that is operative to open between said source chamber and said reservoir chamber is response to elevated pneumatic pressure in said source chamber to enable said tank to receive compressed air from said compressor;

said control valve assembly having a primary exit port pneumatically connected to said coupling, and a second valve that is operative to open between said reservoir chamber and said primary exit port in response to elevated pneumatic pressure in said reservoir chamber to enable said coupling to receive compressed air from said tank;

said control valve assembly further having a bypass exit port pneumatically connected to said coupling, and a third valve that is operative to open between said source chamber and said bypass exit port in response to elevated pneumatic pressure in said source chamber to enable said coupling to receive compressed air from said compressor;

wherein said first valve is operative to open in response to pneumatic pressure of at least a first level, said second valve is operative to open in response to pneumatic pressure of at least a second level that is less than said first level, and said third valve is operative to open in response to pneumatic pressure of at least a third level that is less than said first level.

8. An apparatus as defined in claim 7 wherein said second and third levels are equal.

9. An apparatus as defined in claim 7 wherein said compressor, said pneumatic output coupling, and said control valve assembly are mounted on said tank.

10. An apparatus as defined in claim 7 wherein said bypass exit port is pneumatically connected to said coupling in parallel with said primary exit port.

11. An apparatus as defined in claim 10 further comprising an actuator valve that is pneumatically connected between said control valve assembly and said coupling, and is shiftable between open and closed conditions between said exit ports and said coupling.

12. An apparatus as defined in claim 11 wherein said actuator valve is a pressure regulator.

13. An apparatus as defined in claim 7 wherein said first, second and third valves are spring loaded check valves.

14. An apparatus for use with a source of compressed air, a reservoir of compressed air, and a pneumatic device, said apparatus comprising:

a.) a control valve assembly including a housing that contains valves and is configured to be connected pneumatically between the source, the reservoir, and the pneumatic device, the valves being shiftable between open and closed conditions respectively opening and closing pneumatic flow paths extending separately through said housing, including a first flow path extending from the source to the reservoir, a second flow path extending from the reservoir to the pneumatic device, and a third flow path extending from the source to the pneumatic device;

wherein said housing and valves together comprise:

a source chamber with a source port to communicate with the source, a reservoir chamber with a reservoir port to communicate with the reservoir, and a first valve that is operative to open between said source chamber and said reservoir chamber to open said first flow path in response to elevated pneumatic pressure in said source chamber;

a primary exit port to communicate with the pneumatic device, and a second valve that is operative to open between said reservoir chamber and said primary exit port to open said second flow path in response to elevated pneumatic pressure in said reservoir chamber; and a bypass exit port to communicate with the pneumatic device, and a third valve that is operative to open between said source chamber and said bypass exit port to open said third flow path in response to elevated pneumatic pressure in said source chamber;

b.) an output coupling that is connectable to the pneumatic device in an arrangement in which said bypass exit port is pneumatically connected to said output coupling in parallel with said primary exit port; and c.) a pressure regulator that is pneumatically connectable between said control valve assembly and said output coupling, and is shiftable between open and closed conditions between said exit ports and said output coupling.

15. An apparatus for use with a source of compressed air, a reservoir of compressed air, and a pneumatic device, said apparatus comprising:

a control valve assembly including a housing that contains valves and is configured to be connected pneumatically between the source, the reservoir, and the pneumatic device, the valves being shiftable between open and closed conditions respectively opening and closing pneumatic flow paths extending separately through said housing, including a first flow path extending from the source to the reservoir, a second flow path extending from the reservoir to the pneumatic device, and a third flow path extending from the source to the pneumatic device;

wherein said housing and valves together comprise:

a source chamber with a source port to communicate with the source, a reservoir chamber with a reservoir port to communicate with the reservoir, and a first spring loaded check valve that is operative to open between said source chamber and said reservoir chamber to open said first flow path in response to elevated pneumatic pressure in said source chamber;

a primary exit port to communicate with the pneumatic device, and a second spring loaded check valve that is operative to open between said reservoir chamber and said primary exit port to open said second flow path in response to elevated pneumatic pressure in said reservoir chamber; and a bypass exit port to communicate with the pneumatic device, and a third spring loaded check valve that is operative to open between said source chamber and said bypass exit port to open said third flow path in response to elevated pneumatic pressure in said source chamber.

16. An apparatus use with a pneumatic device, said apparatus comprising:

a source of compressed air;

a reservoir for compressed air;

a pneumatic output coupling connectable to the pneumatic device;

a control valve assembly having a housing with ports that are interconnected by chambers within said housing, including a source port pneumatically connected to said source, a reservoir port pneumatically connected to said reservoir, a primary exit port pneumatically connected to said output coupling, and a bypass exit port pneumatically connected to said output coupling in parallel with said primary exit port;

wherein said control valve assembly is shiftable between open and closed conditions respectively opening and closing pneumatic flow paths extending separately through said housing, including a first flow path extending from said source port to said reservoir port, a second flow path extending from said reservoir port to said primary exit port, and a third flow path extending from said source port to said bypass exit port; and a pressure regulator that is pneumatically connected between said control valve assembly and said coupling, and is shiftable between open and closed conditions between said exit ports and said coupling.

17. An apparatus for use with a pneumatic device, said apparatus comprising:

a source of compressed air;

a reservoir for compressed air;

a pneumatic output coupling connectable to the pneumatic device; and a control valve assembly having a housing with ports that are interconnected by chambers within said housing, including a source port pneumatically connected to said source, a reservoir port pneumatically connected to said reservoir, a primary exit port pneumatically connected to said output coupling, and a bypass exit port pneumatically connected to said output coupling in parallel with said primary exit port;

wherein said control valve assembly is shiftable between open and closed conditions respectively opening and closing pneumatic flow paths extending separately through said housing, including a first flow path extending from said source port to said reservoir port, a second flow path extending from said reservoir port to said primary exit port, and a third flow path extending from said source port to said bypass exit port; and wherein said housing contains a first valve that is operative to open between said source port and said reservoir port in response to elevated pressure at said source port to enable said reservoir to receive compressed air from said source, a second valve that is operative to open between said reservoir port and said primary exit port in response to elevated pressure at said reservoir port to enable said coupling to receive compressed air from said reservoir, and a third valve that is operative to open between said source port and said bypass exit port in response to elevated pressure at said source port to enable said coupling to receive compressed air from said source.

18. An apparatus as defined in claim 17 wherein said first, second and third valves are spring loaded check valves.

19. An apparatus as defined in claim 17 wherein said first valve is operative to open in response to pneumatic pressure of at least a first level, said second valve is operative to open in response to pneumatic pressure of at least a second level that is less than said first level, and said third valve is operative to open in response to pneumatic pressure of at least a third level that is less than said first level.

20. An apparatus as defined in claim 19 wherein said second and third levels are equal.

* * * * *